US012501923B2

(12) United States Patent
Purzner (10) Patent No.: US 12,501,923 B2
(45) Date of Patent: *Dec. 23, 2025

(54) NEURODEVELOPMENT-PROMOTING FOOD COMPOSITIONS AND KITS, SYSTEMS AND METHODS RELATED THERETO

(71) Applicant: The Board of Trustees of the Leland Stanford Junior University, Stanford, CA (US)

(72) Inventor: Teresa Purzner, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 517 days.

This patent is subject to a terminal disclaimer.

(21) Appl. No.: 17/973,306

(22) Filed: Oct. 25, 2022

(65) Prior Publication Data

US 2023/0048733 A1 Feb. 16, 2023

Related U.S. Application Data

(63) Continuation of application No. 16/464,253, filed as application No. PCT/US2018/030921 on May 3, 2018, now Pat. No. 11,523,630.

(Continued)

(51) Int. Cl.
*A23L 33/12* (2016.01)
*A23L 33/105* (2016.01)

(Continued)

(52) U.S. Cl.
CPC .............. *A23L 33/12* (2016.08); *A23L 33/105* (2016.08); *A23L 33/155* (2016.08); *A23L 33/16* (2016.08)

(58) Field of Classification Search
CPC ...... A23V 2250/1868; A23V 2250/712; A23V 2250/706; A23V 2250/71;

(Continued)

(56) References Cited

U.S. PATENT DOCUMENTS 5,985,339 A 11/1999 Kamarei
6,576,666 B2 6/2003 Hermelin et al.

(Continued)

FOREIGN PATENT DOCUMENTS

CN 104187740 A 12/2014
JP 2004-518609 A 6/2004

(Continued)

OTHER PUBLICATIONS

Nutrition with Judy, retrieved online Mar. 22, 2025, pp. 1 https://www.nutritionwithjudy.com/microblog-the-nutrition-facts-of-wild-atlantic-salmon (Year: 2025).*

(Continued)

*Primary Examiner* — Hong T Yoo
(74) *Attorney, Agent, or Firm* — Bret E. Field; Bozicevic, Field & Francis LLP (57) ABSTRACT

Provided are food compositions configured to promote neurodevelopment in developing subjects. Food compositions of the present disclosure may make available to a subject those nutrients that are required by or otherwise positively influence developing brain regions, and the neurons thereof, during specific windows of neurodevelopment. Also provided are kits and systems that relate to the subject food compositions as well as methods, such as methods of formulating the described food compositions.

17 Claims, 3 Drawing Sheets

| | | | | | | | | Age (mos.) | | | | | | | | |
|---|---|---|---|---|---|---|---|---|---|---|---|---|---|---|---|---|
| | 3 | 4 | 5 | 6 | 7 | 8 | 9 | 10 | 11 | 12 | 13 | 14 | 15 | 16 | 17 | 18 |
| | protein | protein | protein | protein | protein | protein | protein | protein | protein | protein | protein | protein | protein | protein | protein | protein |
| | iron | iron | iron | iron | iron | iron | iron | iron | iron | iron | iron | iron | iron | iron | iron | iron |
| | lutein | lutein | lutein | lutein | lutein | lutein | lutein | lutein | | | | | | | | |
| | vitamin A | vitamin A | vitamin A | vitamin A | vitamin A | vitamin A | vitamin A | vitamin A | | | | | | | | |
| | iodione | iodione | iodione | iodione | iodione | iodione | iodione | iodione | iodione | iodione | iodione | iodione | iodione | iodione | iodione | iodione |
| | zinc | zinc | zinc | zinc | zinc | zinc | zinc | zinc | zinc | zinc | zinc | zinc | zinc | zinc | zinc | zinc |
| | folic acid | folic acid | folic acid | folic acid | folic acid | folic acid | folic acid | folic acid | | | | | | | | |
| Nutrients | copper | copper | copper | copper | copper | copper | copper | copper | | | | | | | | |
| | vitamin D | vitamin D | vitamin D | vitamin D | vitamin D | vitamin D | vitamin D | vitamin D | | | | | | | | |
| | vitamin B3 | vitamin B3 | vitamin B3 | vitamin B3 | vitamin B3 | vitamin B3 | vitamin B3 | vitamin B3 | | | | | | | | |
| | DHA | DHA | DHA | DHA | DHA | DHA | DHA | DHA | DHA | DHA | DHA | DHA | DHA | DHA | DHA | DHA |
| | selenium | selenium | selenium | selenium | selenium | selenium | selenium | selenium | selenium | selenium | | | | | | |
| | Vitamin E | | | | | | | | Vitamin E | Vitamin E | Vitamin E | | | Vitamin E | Vitamin E | Vitamin E | Vitamin E |
| | choline | choline | choline | choline | choline | choline | choline | choline | choline | choline | choline | choline | choline | choline | choline | choline |
| | vitamin B12 | | | vitamin B12 | vitamin B12 | vitamin B12 | vitamin B12 | vitamin B12 | vitamin B12 | vitamin B12 | vitamin B12 | vitamin B12 | vitamin B12 | vitamin B12 | vitamin B12 | vitamin B12 |
| | vitamin B6 | vitamin B6 | vitamin B6 | vitamin B6 | vitamin B6 | vitamin B6 | vitamin B6 | vitamin B6 | vitamin B6 | vitamin B6 | vitamin B6 | vitamin B6 | vitamin B6 | vitamin B6 | vitamin B6 | vitamin B6 |

Related U.S. Application Data (60) Provisional application No. 62/501,602, filed on May 4, 2017.

(51) Int. Cl.
 *A23L 33/155* (2016.01)
 *A23L 33/16* (2016.01)

(58) Field of Classification Search
 CPC ...... A23V 2250/704; A23V 2250/7052; A23V 2250/1592; A23V 2250/156; A23V 2200/00; A23V 2250/70; A23V 2200/08; A23V 2250/1598; A23V 2250/7046; A23L 33/40; A23L 33/15; A23L 33/10; A23L 33/16
 USPC ..... 426/801, 601, 72, 73, 74, 648, 802, 800; 514/5.5
 See application file for complete search history.

(56) References Cited

U.S. PATENT DOCUMENTS

| | | | |
|---|---|---|---|
| 6,630,452 | B2 | 10/2003 | Wilson |
| 7,829,126 | B2 | 11/2010 | Barrett-Reis et al. |
| 9,414,618 | B2 | 8/2016 | Shao et al. |
| 9,591,872 | B2 | 3/2017 | Rosado Loria et al. |
| 2006/0088574 | A1 | 4/2006 | Manning et al. |
| 2007/0098849 | A1 | 5/2007 | Barrett-Reis et al. |
| 2014/0271562 | A1 | 9/2014 | Garcia-Rodenas et al. |
| 2016/0022628 | A1 | 1/2016 | Lai et al. |
| 2016/0128367 | A1 | 5/2016 | Huntsman |
| 2016/0316809 | A1 | 11/2016 | Dde Castro et al. |
| 2020/0023022 | A1 | 1/2020 | Scoglio |

FOREIGN PATENT DOCUMENTS

| | | |
|---|---|---|
| JP | 2013-529475 A | 7/2013 |
| JP | 2017-529086 A | 10/2017 |
| RU | 2445796 C2 | 3/2012 |
| RU | 2525338 C2 | 8/2014 |
| WO | WO2007050521 A2 | 5/2007 |
| WO | WO2013138157 A1 | 9/2013 |
| WO | WO2015073515 A1 | 5/2015 |
| WO | WO2016035095 A1 | 3/2016 |

OTHER PUBLICATIONS

Sprague Matthew, Tsz Chong Chau, and David I. Givens, Iodine Content of Wild and Farmed Seafood and Its Estimated Contribution to UK Dietary Iodine Intake, Nurtients 2022, 14, 195, prublished Dec. 21, 2021, pp. 1-23 (Year: 2021).*

Capeding, et al. "RLeusetarechin-fortified infant formula fed to healthy term infants: evaluation of growth effects and safety", Capeding et al. Nutrition Journal, 2010, 9:22, pp. 1-9.

Geogieff, "Nutrition and the developing brain: nutrient priorities and measurement1-3", Am J Clin Nutr, 2007;85 (suppl):614S-20S.

European Commission: Health and Consumer Protection Directorate-General, "Report of the Scientific 1-15 Committee on Food on the Revision of Essential Requirements of Infant Formulae and Follow-on Formulae", Report.2003, 213 pages.

Mintel, "Qin Ti Infant Formula Stage 1", retrieved from www.gnpd.com, Database accession No. 2864191, 2014, 4 pages.

Mintel, "Follow-On Formula with Eye Q Plus and Intelli-Pro", retrieved from www.gnpd.com, Database accession No. 4663573, 2017, 3 pages.

Mintel, "Stage 3 Growing Up Milk", retrieved from www.gnpd.com, Database accession No. 4592819, 2017, 3 pages.

Mintel, "Growing-Up Formula Milk Powder Stage 3", retrieved from www.gnpd.com, Database accession No. 3934115, 2016, 5 pages.

Cinnybear, "Broccol i Almond Pesto Quinoa Topped with Tuna—Just. One. More. Bite", Retrieved from :https:jjcinnybear.wordpress.com/2012/06/05/broccoli-almond-pesto-quinoa-topped-with-tuna/, 2012, 3 pages.

Archive of Disease in Childhood, 2007, 92:160-164, Vitamins for Babies and Young Children (Year: 2007).

Mintel, Stage 2 Dry Milk Formula, Sep. 2016, ID#:4276059, 5 pages, http://www.gnpd.com, retrieved on Mar. 10, 2022; English summary enclosed.

Mintel, Newborn Infant Formula Stage 1, Apr. 2017, ID#:4770371, 4 pages, http://www.gnpd.com, retrieved on Mar. 10, 2022; English summary enclosed.

Mintel, Platinum Growing Up Milk 3, Mar. 2017, ID#:4727213, 5 pages, http://www.gnpd.com, retrieved on Mar. 10, 2022; English summary enclosed.

Mintel, Infant Formula Milk Powder Stage 1, Apr. 2017, ID#:4753189, 6 pages, http://www.gnpd.com, retrieved on Mar. 10, 2022; English summary enclosed.

A little early. Here are some hot pot recipes I want to make this winter! (Tyotto-ki-ga-hayai-kedo. Kono-huyu-tsukuri-tai-nabe-resipi-ha-kore!), Kinarino, 2014, 11 pages, https://kinarino.jp, retrieved on Mar. 9, 2022; Recipes for various Japanese hotpot dishes.

Amount and Schedule of Baby Formula Feedings, The American Academy of Pediatrics, https://www.healthychildren.org/English/ages-stages/baby/formula-feeding/Pages/amount-and-schedule-of-formula-feedings.aspx, Last Updated May 16, 2022, retrieved on Jun. 3, 2024, 3 pages.

Dietary Reference Intakes for Japanese (2015), Ministry of Health, Labour and Welfare.

Dietary Reference Values for choline, Scientific Opinion, EFSA Panel on Dietetic Products, Nutrition and Allergies (NDA), EFSA Journal, Apr. 21, 2016; 14(8):4484.

Fats and fatty acids in human nutrition, Report of an expert consultation, FAO Food and Nutrition Paper 91, Nov. 10-14, 2008, Geneva, p. 12, Table 2, line 2.

Ramirez, Why lutein is important for the eye and the brain, OCL, 23(1) D107 (2016).

* cited by examiner

| Nutrients | Age (mos.) | | | | | | | | | | | | | | | |
|---|---|---|---|---|---|---|---|---|---|---|---|---|---|---|---|---|
| | 3 | 4 | 5 | 6 | 7 | 8 | 9 | 10 | 11 | 12 | 13 | 14 | 15 | 16 | 17 | 18 |
| | protein | protein | protein | protein | protein | protein | protein | protein | protein | protein | protein | protein | protein | protein | protein | protein |
| | iron | iron | iron | iron | iron | iron | iron | iron | iron | iron | iron | iron | iron | iron | iron | iron |
| | lutein | lutein | lutein | lutein | lutein | lutein | lutein | lutein | | | | | | | | |
| | vitamin A | vitamin A | vitamin A | vitamin A | vitamin A | vitamin A | vitamin A | vitamin A | | | | | | | | |
| | iodione | iodione | iodione | iodione | iodione | iodione | iodione | iodione | iodione | iodione | iodione | iodione | iodione | iodione | iodione | iodione |
| | zinc | zinc | zinc | zinc | zinc | zinc | zinc | zinc | zinc | zinc | zinc | zinc | zinc | zinc | zinc | zinc |
| | folic acid | folic acid | folic acid | folic acid | folic acid | folic acid | folic acid | folic acid | | | | | | | | |
| | copper | copper | copper | copper | copper | copper | copper | copper | | | | | | | | |
| | vitamin D | vitamin D | vitamin D | vitamin D | vitamin D | vitamin D | vitamin D | vitamin D | | | | | | | | |
| | vitamin B3 | vitamin B3 | vitamin B3 | vitamin B3 | vitamin B3 | vitamin B3 | vitamin B3 | vitamin B3 | | | | | | | | |
| | DHA | DHA | DHA | DHA | DHA | DHA | DHA | DHA | DHA | DHA | DHA | DHA | DHA | DHA | DHA | DHA |
| | selenium | selenium | selenium | selenium | selenium | selenium | selenium | selenium | selenium | selenium | | | | | | |
| | Vitamin E | | | | | | | | Vitamin E | Vitamin E | | | Vitamin E | Vitamin E | Vitamin E | Vitamin E |
| | choline | choline | choline | choline | choline | choline | choline | choline | choline | choline | choline | choline | choline | choline | choline | choline |
| | vitamin B12 | vitamin B12 | vitamin B12 | vitamin B12 | vitamin B12 | vitamin B12 | vitamin B12 | vitamin B12 | vitamin B12 | vitamin B12 | vitamin B12 | vitamin B12 | vitamin B12 | vitamin B12 | vitamin B12 | vitamin B12 |
| | vitamin B6 | vitamin B6 | vitamin B6 | vitamin B6 | vitamin B6 | vitamin B6 | vitamin B6 | vitamin B6 | vitamin B6 | vitamin B6 | vitamin B6 | vitamin B6 | vitamin B6 | vitamin B6 | vitamin B6 | vitamin B6 |

NEURODEVELOPMENT-PROMOTING FOOD COMPOSITIONS AND KITS, SYSTEMS AND METHODS RELATED THERETO

CROSS-REFERENCE TO RELATED APPLICATIONS

This application is a Continuation of U.S. patent application Ser. No. 16/464,253 filed May 24, 2019, which application is a U.S. National Stage Application of PCT Application No. PCT/US2018/030921 filed May 3, 2018, which application, pursuant to 35 U.S.C. § 119 (e), claims priority to the filing date of the U.S. Provisional Patent Application Ser. No. 62/501,602, filed May 4, 2017, the disclosures of which applications are herein incorporated by reference.

BACKGROUND

A great deal of brain development occurs in the first post-natal years of life. During this period specific neural regions grow and develop during specific time windows. The brain's vulnerability to lack of sufficient nutrition likely outweighs its plasticity, as evidenced by the presence of developmental brain dysfunction not only when a particularly important nutrient is in deficit, but also the persistence of such dysfunction when the nutrient is provided later, after closure of the relevant developmental window. Early postnatal growth and nutrient intake have been demonstrated to influence brain growth and maturation with subsequent effects on neurodevelopment that persist into childhood and adolescence.

SUMMARY

Provided are food compositions configured to promote neurodevelopment in developing subjects. Food compositions of the present disclosure may make available to a subject those nutrients that are required by or otherwise positively influence developing brain regions, and the neurons thereof, during specific windows of neurodevelopment. Also provided are kits and systems that relate to the subject food compositions as well as methods, such as methods of formulating the described food compositions.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION

Provided are food compositions configured to promote neurodevelopment in developing subjects. Food compositions of the present disclosure may make available to a subject those nutrients that are required by or otherwise positively influence developing brain regions, and the neurons thereof, during specific windows of neurodevelopment. Also provided are kits and systems that relate to the subject food compositions as well as methods, such as methods of formulating the described food compositions.

Before the present methods and compositions are described, it is to be understood that this invention is not limited to particular method or composition described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that as used herein and in the appended claims, the singular forms "a", "an", and "the" include plural referents unless the context clearly dictates otherwise. Thus, for example, reference to "a cell" includes a plurality of such cells and reference to "the peptide" includes reference to one or more peptides and equivalents thereof, e.g. polypeptides, known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Compositions and Methods

As summarized above, the present disclosure provides food compositions configured to promote neurodevelopment in developing subjects and methods for making such food compositions. The food compositions of the present disclosure may make available to a subject those nutrients that are required during specific windows of neurodevelopment. The food compositions of the present disclosure may positively influence the development of specific brain regions, and the neurons thereof, including e.g., brain regions which grow/develop during specific windows of neurodevelopment.

The subject food compositions may be formulated for administration to mammalian subjects, including e.g., humans. The subject food compositions may be formulated for administration to human infants.

The subject food compositions may be formulated for the administration to a human infant during the development of one or more brain regions, including e.g., during a peak neurodevelopmental window for a specific brain region. Brain regions of interest include but are not limited to e.g., the amygdala region, the angular gyrus region, the Broca's region, the calcarine region, the caudate (R) region, the cerebellum region, the cingulum region, the cingulum (post) region, the cuneus (R) region, the DLPFC region, the frontal (inf) region, the frontal (mid) region, the frontal (sup) region, the fusiform region, the hippocampus region, the insula region, the lingula region, the occipital (inf) region, the occipital (middle) region, the occipital (sup) region, the olfactory region, the orbital (medial) region, the pallidum region, the paracentral Lobule (R) region, the para-hippocampal (R) region, the parietal (Inf) region, the Parietal (Sup, R) region, the precunius region, the primary auditory (Heschl) region, the putament region, the Rectus region, the rolandic region, the SMA region, the temporal (in) region, the temporal (middle) region, the temporal (sup) region, the temporal pole region, the Wernicke's region, and the like.

Figure 1:
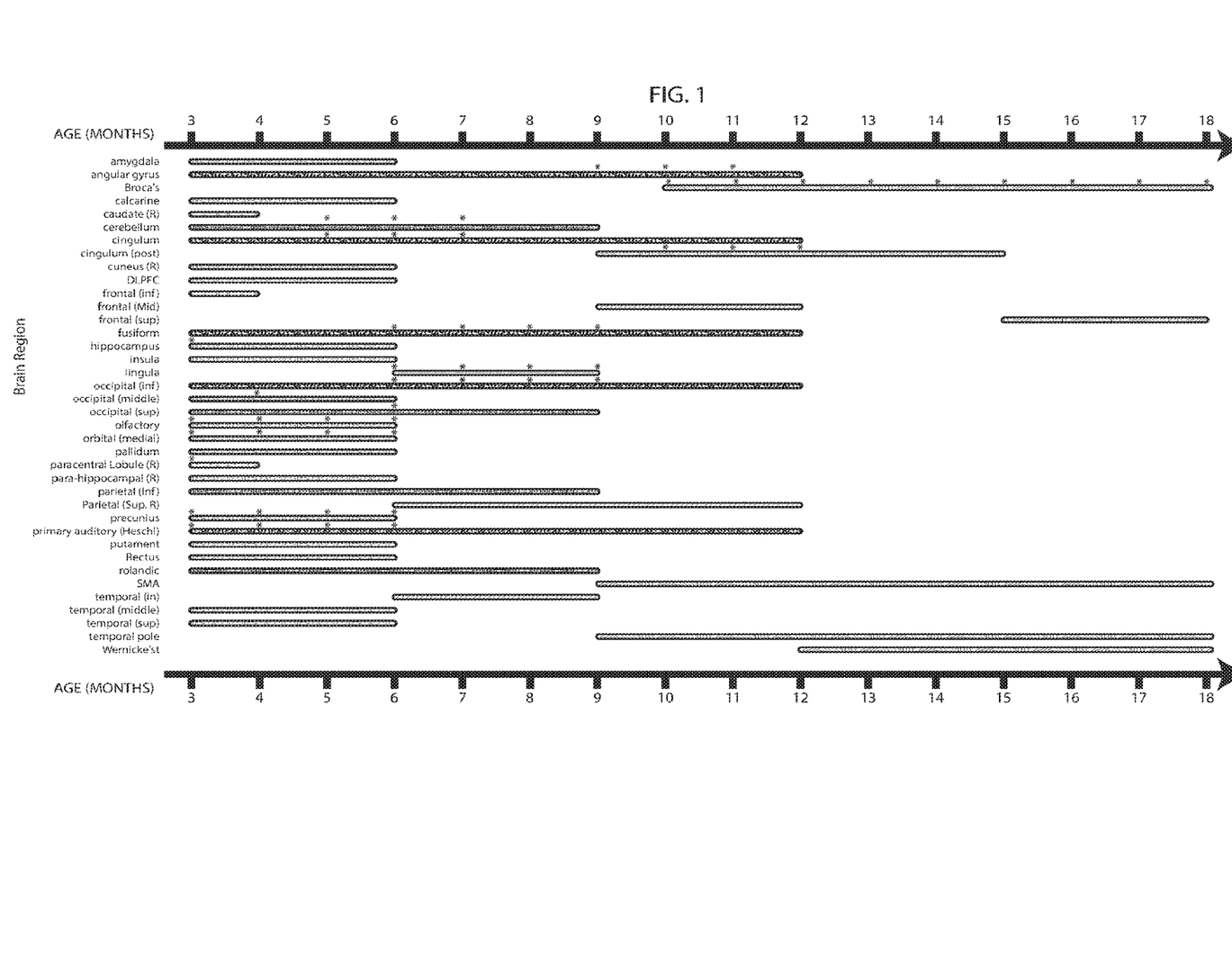
FIG. 1 depicts the development of specific brain regions between 3 and 18 months of age.

A chart showing month-by-month developmental time windows for specific brain regions is provided in FIG. 1. The subject food compositions may promote development of specific brain regions, or the neurons thereof, by providing nutrients required by the brain area during the developmental window for that area. The subject food compositions may promote development of specific brain regions, or the neurons thereof, by providing nutrients that enhance the development of the brain area during the developmental window for that area. By "promoting development" and "enhancing development", as used herein, is generally meant any positive influence on the development of the brain area, including preventing under-development, preventing abnormal development, enhancing growth, and the like.

In some instances, the subject food compositions may promote balanced growth or development. Balanced growth and/or development may refer to the balanced growth and/or development of the brain of an infant and/or the cognitive function of the infant. This may refer to physical development of the brain, including neurotransmitter activity and also brain or head circumference and/or the size/shape of specific brain regions. This may also refer to any brain function or behavior observed in the infant or later in the life of the infant, such as mood, appetite, sleep, memory, learning, and some social behaviors of the infant. It may also refer to preventing or reducing the infant's risk for developing various neurological disorders of the central nervous system and/or a psychiatric disease in later life. Any convenient measure of the physical, chemical and or physiological characteristics of a particular subject's brain may be evaluated, e.g., through the use of standard measures and test.

Figure 2:
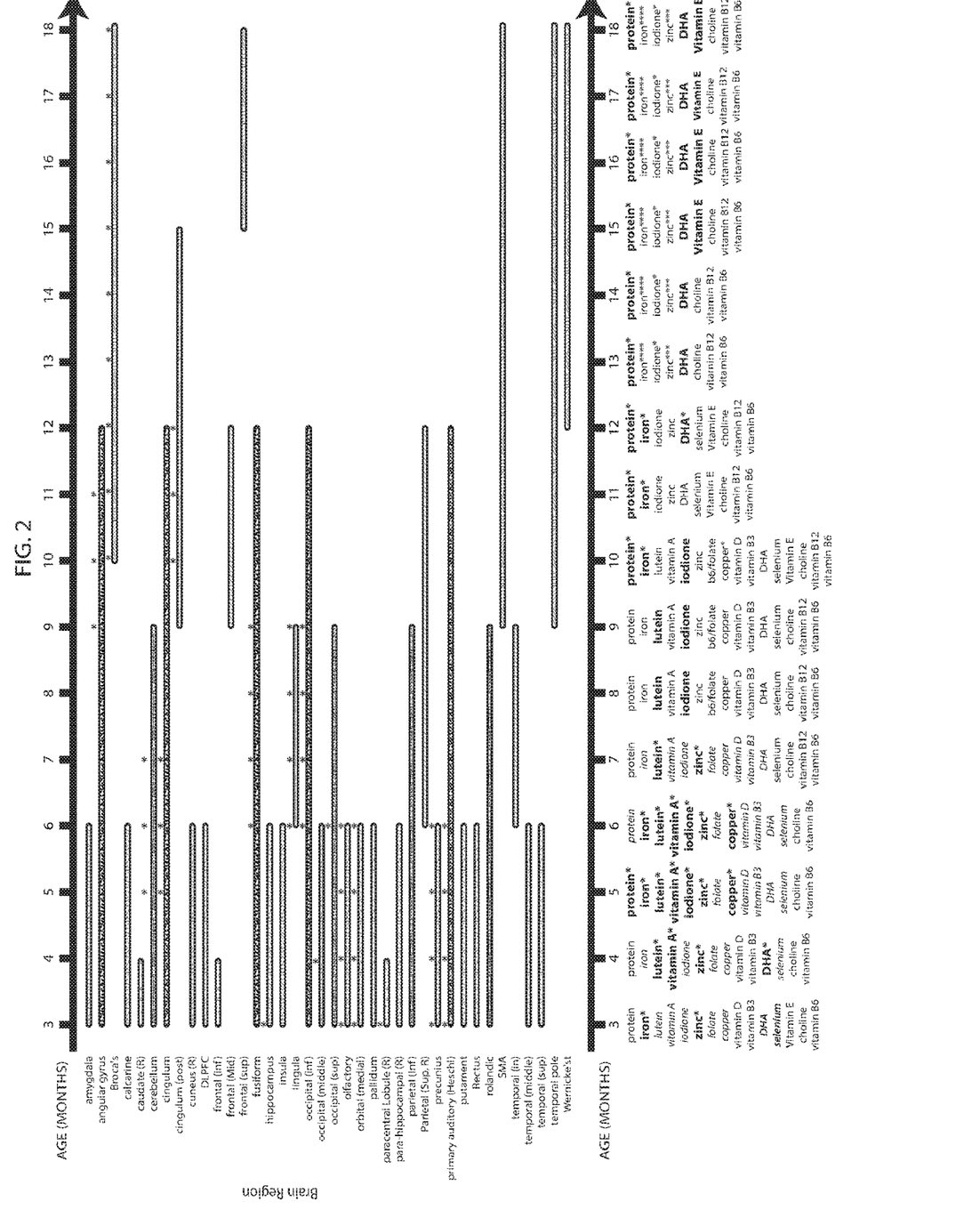
FIG. 2 depicts the nutrient requirements for the relevant brain regions at each month of development corresponding to the development of specific brain regions between 3 and 18 months of age as depicted in FIG. 1.
Figure 3:
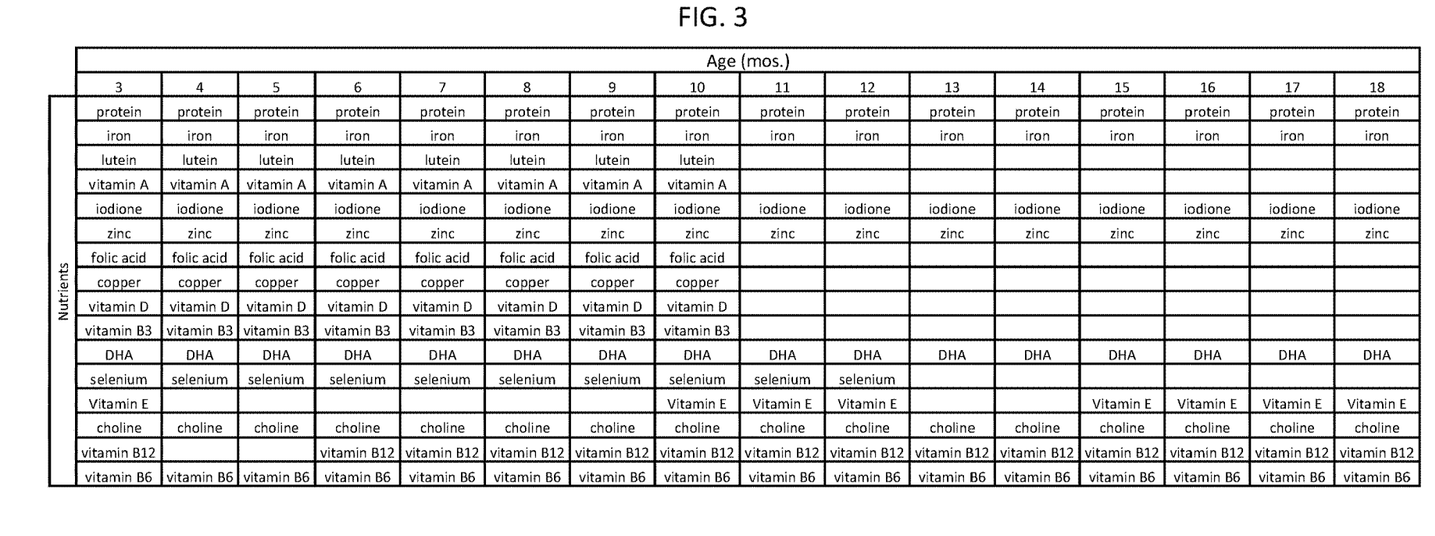
FIG. 3 provides Table 1.

Besides being administered to an infant at particular times of neurodevelopment and/or during the development of particular brain regions, the subject food compositions are specifically formulated for such administration, e.g., including or excluding specific nutrients specific for the needs of the specific brain regions, and neurons thereof, which are developing during the time period. For example, FIG. 2 provides lists of nutrients, for each month, overlaid on the month-by-month developmental time windows provided in FIG. 1. As can be seen in FIG. 2, the subject food compositions may be tailored for administration windows of various length including monthly windows, 2 month windows, 3 month windows, 4 month windows, 5 month windows, 6 month windows, 7 month windows, 8 month windows, 9 month windows, 10 month windows, 12 month windows, and/or any combination thereof.

As summarized above, the food compositions may be formulated for administration to an infant during a particular time or over a particular time window based on the age of the infant including e.g., infants aged from birth to 18 months, including but not limited to e.g., from 0 to 18 months, from 1 month to 18 months, from 2 months to 18 months, from 3 months to 18 months, from 4 months to 18 months, 5 months to 18 months, 6 months to 18 months, 7 months to 18 months, 8 months to 18 months, 9 months to 18 months, 10 months to 18 months, 11 months to 18 months, 12 months to 18 months, 13 months to 18 months, 14 months to 18 months, 15 months to 18 months, 16 months to 18 months, 17 months to 18 months, from 3 months to 17 months, from 3 months to 16 months, from 3 months to 15 months, from 3 months to 14 months, from 3 months to 13 months, from 3 months to 12 months, from 3 months to 11 months, from 3 months to 10 months, from 3 months to 9 months, from 3 months to 8 months, from 3 months to 7 months, from 3 months to 6 months, from 3 months to 5 months, from 3 months to 4 months, 3 months to 6 months, 7 months to 9 months, 10 months to 12 months, 13 months to 18 months, 1 month, 2 months, 3 months, 4 months, 5 months, 6 months, 7 months, 8 months, 9 months, 10 months, 11 months, 12 months, 13 months, 14 months, 15 months, 16 months, 17 months, 18 months, and the like.

Infant age may be determined by any convenient means including but not limited to e.g., age from birth, gestational age, etc. In some instances, a particular formulation may be configured for administration to a preterm or premature infant. In some instances, formulations may be limited to configurations for full-term (40 weeks gestation or greater) or near-full term (e.g., 38 weeks gestation or greater) infants.

Compositions of the present disclosure include food product compositions. A food composition is a nourishing substance that is eaten, drunk, or otherwise taken into the body to sustain life, provide energy, promote growth, etc. The subject food compositions will vary and will generally include a mixture of two or more different food components, including 3 or more, 4 or more, 5 or more, 6 or more, 7 or more, 8 or more, 9 or more, 10 or more, 11 or more, 12 or more, 13 or more, 14 or more, 15 or more, etc., different food components.

As used herein the term "food component" refers to a plant or animal based nourishing substance of natural and non-synthetic origin. Food components utilized in the making of food compositions of the present disclosure may be unprocessed or processed. By "food processing" is meant the transformation of raw ingredients or food stuffs, by physical or chemical means, into food or a food product of a different form. Food processing may involve freezing, drying, freeze-drying, dicing, slicing, mincing, macerating, liquefaction, emulsification, cooking (such as boiling, broiling, frying, grilling, steaming, searing, etc.), pickling, curing, pasteurizing, fermenting, blending, pureeing and the like. By "unprocessed" is meant food stuffs that have not undergone one or more of such processing steps. In some instances, certain food components utilized in the compositions of the present disclosure may be unprocessed prior to their addition to the subject compositions. In some instances, certain food components utilized in the compositions of the present disclosure may be processed, e.g., such as by cooking, prior to their addition to the subject compositions.

The subject food compositions may include one or more of a lutein-containing component, a DHA-containing component, an iron-containing component, a zinc-containing component, a copper-containing component, a choline-containing component, a vitamin A-containing component, a vitamin B6-containing component, a selenium-containing component, a iodine-containing component, a folate-containing component, a vitamin D-containing component, a vitamin B3-containing component, a vitamin E-containing component and a vitamin B12-containing component.

Food compositions of the present disclosure may include one or more lutein-containing food components. In some instances, the lutein-containing food component may be or may be derived from one or more of leafy greens, broccoli, zucchini, brussel sprouts, garden peas, corn, carrots, okra, celery, oranges, tomatoes, melons, grapefruit, beets, asparagus, eggs, spinach, kiwi, grapes, zucchini, squash, etc. In some instances, the composition contains an amount of one or more lutein-containing food components such that the composition contains between 0 to 150 µg of lutein, including but not limited to e.g., 0 to 150 µg of lutein, 1 to 150 µg of lutein, 0 to 100 µg of lutein, 1 to 100 µg of lutein, 0 to 75 µg of lutein, 1 to 75 µg of lutein, 0 to 50 µg of lutein, 1 to 50 µg of lutein, 10 to 150 µg of lutein, 25 to 150 µg of lutein, 10 to 100 µg of lutein, 25 to 100 µg of lutein, 10 to 75 µg of lutein, 25 to 75 µg of lutein, 10 to 50 µg of lutein, 25 to 50 µg of lutein, etc.

Food compositions of the present disclosure may include one or more docosahexaenoic acid (DHA)-containing food components. In some instances, the DHA-containing food component may be or may be derived from one or more of fish, eggs, walnuts, chia, flaxseed, seaweed, lamb, beef, game meat, poultry, etc. In some instances, the composition contains an amount of one or more DHA-containing food components such that the composition contains between 0 to 50 mg of DHA, including but not limited to e.g., 0 to 50 mg of DHA, 1 to 50 mg of DHA, 0 to 35 mg of DHA, 1 to 35 mg of DHA, 0 to 25 mg of DHA, 1 to 25 mg of DHA, 0 to 20 mg of DHA, 1 to 20 mg of DHA, 5 to 50 mg of DHA, 10 to 50 mg of DHA, 5 to 35 mg of DHA, 10 to 35 mg of DHA, 5 to 25 mg of DHA, 10 to 25 mg of DHA, 5 to 20 mg of DHA, 10 to 20 mg of DHA, etc.

Food compositions of the present disclosure may include one or more iron-containing food components. In some instances, the iron-containing food component may be or may be derived from one or more of beef, chicken, turkey, ham, fish, veal, beans, tofu, breakfast cereal, pumpkin seeds, sesame seeds, squash seeds, lima beans, kidney beans, chickpeas, dried apricots, baked potato, egg noodles, wheat germ, split peas, nuts, dried raisins, dried peaches, dried prunes, broccoli, raw spinach, pasta, bread, brown or enriched rice, etc. In some instances, the composition contains an amount of one or more iron-containing food components such that the composition contains between 0 to 10 mg of iron, including but not limited to e.g., 0 to 10 mg of iron, 1 to 10 mg of iron, 0 to 9 mg of iron, 1 to 9 mg of iron, 0 to 8 mg of iron, 1 to 8 mg of iron, 0 to 6 mg of iron, 1 to 6 mg of iron, 2 to 10 mg of iron, 3 to 10 mg of iron, 2 to 9 mg of iron, 3 to 9 mg of iron, 2 to 8 mg of iron, 3 to 8 mg of iron, 2 to 6 mg of iron, 3 to 6 mg of iron, etc.

Food compositions of the present disclosure may include one or more zinc-containing food components. In some instances, the zinc-containing food component may be or may be derived from one or more of oysters, beef, lamb, wheat germ, spinach, pumpkin seeds, cashews, chocolate, pork, chicken, chickpeas, fortified cereal, oatmeal, kidney beans, almonds, flax seeds, lima beans, eggs yolks, peanuts, brown rice, peas, etc. In some instances, the composition contains an amount of one or more zinc-containing food components such that the composition contains between 0 to 10 mg of zinc, including but not limited to e.g., 0 to 10 mg of zinc, 1 to 10 mg of zinc, 0 to 5 mg of zinc, 1 to 5 mg of zinc, 0 to 4 mg of zinc, 1 to 4 mg of zinc, 2 to 10 mg of zinc, 3 to 10 mg of zinc, 2 to 5 mg of zinc, 3 to 5 mg of zinc, 2 to 4 mg of zinc, 3 to 4 mg of zinc, etc.

Food compositions of the present disclosure may include one or more copper-containing food components. In some instances, the copper-containing food component may be or may be derived from one or more of sunflower seeds, lentils, almonds, asparagus, seafood, kale, sesame seeds, cashews, chickpeas, avocados, goat cheese, blackberries, kiwi, grapes, mangos, raspberries, pineapple, bosc pears, potatoes, turnip, taro, lima beans, spinach, asparagus, swiss chard, lentils, almonds, etc. In some instances, the composition contains an amount of one or more copper-containing food components such that the composition contains between 0 to 0.7 mg of copper, including but not limited to e.g., 0 to 0.7 mg of copper, 0.1 to 0.7 mg of copper, 0 to 0.6 mg of copper, 0.1 to 0.6 mg of copper, 0 to 0.5 mg of copper, 0.1 to 0.5 mg of copper, 0 to 0.4 mg of copper, 0.1 to 0.4 mg of copper, 0.2 to 0.7 mg of copper, 0.3 to 0.7 mg of copper, 0.2 to 0.6 mg of copper, 0.3 to 0.6 mg of copper, 0.2 to 0.5 mg of copper, 0.3 to 0.5 mg of copper, 0.2 to 0.4 mg of copper, 0.3 to 0.4 mg of copper, etc.

Food compositions of the present disclosure may include one or more choline-containing food components. In some instances, the choline-containing food component may be or may be derived from one or more of liver, eggs, cauliflower, mushrooms, beet greens, shellfish, asparagus, brussel sprouts, cooked bok choy, collard greens, broccoli, swiss chard, spinach, chicken, turkey, tuna, salmon, beef, green peas, cabbage, green beans, summer squash, etc. In some instances, the composition contains an amount of one or more choline-containing food components such that the composition contains between 0 to 55 mg of choline, including but not limited to e.g., 0 to 55 mg of choline, 1 to 55 mg of choline, 0 to 50 mg of choline, 1 to 50 mg of choline, 0 to 35 mg of choline, 1 to 35 mg of choline, 0 to 25 mg of choline, 1 to 25 mg of choline, 5 to 55 mg of choline, 10 to 55 mg of choline, 5 to 50 mg of choline, 10 to 50 mg of choline, 5 to 35 mg of choline, 10 to 35 mg of choline, 5 to 25 mg of choline, 10 to 25 mg of choline, etc.

Food compositions of the present disclosure may include one or more vitamin A-containing food components. In some instances, the vitamin A-containing food component may be or may be derived from one or more of vitamin A-containing food is selected from the group consisting of: sweet potato, carrots, dark leafy greens, squash, dried apricots, cantaloupe, sweet red pepper, tuna, mango, spinach, broccoli, liver, cod oil, eggs, butter, cream, etc. In some instances, the composition contains an amount of one or more vitamin A-containing food components such that the composition contains between 0 to 400 retinol equivalents (RE) of vitamin A, including but not limited to e.g., 0 to 400 RE of vitamin A, 1 to 400 RE of vitamin A, 0 to 375 RE of vitamin A, 1 to 375 RE of vitamin A, 100 to 400 RE of vitamin A, 200 to 400 RE of vitamin A, 100 to 375 RE of vitamin A, 200 to 375 RE of vitamin A, etc.

Food compositions of the present disclosure may include one or more vitamin B6-containing food components. In some instances, the vitamin B6-containing food component may be or may be derived from one or more of sunflower seeds, pistachos, tuna, turkey, chicken, pork, beef, bananas, avocados, spinach, sweet potato, hazelnuts, plantaine, wheat bran, oatmeal, etc. In some instances, the composition contains an amount of one or more vitamin B6-containing food components such that the composition contains between 0 to 1 mg of vitamin B6, including but not limited to e.g., 0 to 1 mg of vitamin B6, 0.1 to 1 mg of vitamin B6, 0 to 0.6 mg of vitamin B6, 0.1 to 0.6 mg of vitamin B6, 0 to 0.3 mg of vitamin B6, 0.1 to 0.3 mg of vitamin B6, 0.2 to 1 mg of vitamin B6, 0.3 to 1 mg of vitamin B6, 0.2 to 0.6 mg of vitamin B6, 0.3 to 0.6 mg of vitamin B6, 0.2 to 0.3 mg of vitamin B6, etc.

Food compositions of the present disclosure may include one or more selenium-containing food components. In some instances, the selenium-containing food component may be or may be derived from one or more of selenium-containing food is selected from the group consisting of: brazil nuts, tuna, oysters, sunflower seeds, whole wheat bread, pork, beef, chicken, turkey, mushrooms, rye, eggs, cheese, mushrooms, oats, wheat, rye, brown rice, soya beans, pasta, etc. In some instances, the composition contains an amount of one or more selenium-containing food components such that the composition contains between 0 to 20 µg of selenium, including but not limited to e.g., 0 to 20 µg of selenium, 1 to 20 µg of selenium, 0 to 15 µg of selenium, 1 to 15 µg of selenium, 0 to 10 µg of selenium, 1 to 10 µg of selenium, 2 to 20 µg of selenium, 5 to 20 µg of selenium, 2 to 15 µg of selenium, 5 to 15 µg of selenium, 2 to 10 µg of selenium, 5 to 10 µg of selenium, etc.

Food compositions of the present disclosure may include one or more iodine-containing food components. In some instances, the iodine-containing food component may be or may be derived from one or more of sea vegetables, cranberries, yogurt, navy beans, strawberries, cheese, potatoes, milk, eggs, lima beans, corn, green peas, bananas, tuna, cod shrimp, baked potato, milk, shrimp, prunes, yogurt, bananas, strawberries, canned corn, white bread, green beans, pineapple, rhubarb, watercress, etc. In some instances, the composition contains an amount of one or more iodine-containing food components such that the composition contains between 0 to 70 µg of iodine, including but not limited to e.g., 0 to 70 µg of iodine, 1 to 70 µg of iodine, 0 to 50 µg of iodine, 1 to 50 µg of iodine, 0 to 40 µg of iodine, 1 to 40 µg of iodine, 10 to 70 µg of iodine, including but not limited to e.g., 10 to 70 µg of iodine, 20 to 70 µg of iodine, 10 to 50 µg of iodine, 20 to 50 µg of iodine, 10 to 40 µg of iodine, 20 to 40 µg of iodine, etc.

Food compositions of the present disclosure may include one or more folic acid-containing food components. In some instances, the folic acid-containing food component may be or may be derived from one or more of black eyed peas, lentils, dark leafy greens, asparagus, avocado, broccoli, mango, citrus fruit, white bread, papaya, strawberries, raspberries, beans, peas, lentils, okra, brussel sprouts, sunflower seed, flax seed, peanuts, almonds, cauliflower, corn, beets, celery, carrots, winter squash, summer squash, etc. In some instances, the composition contains an amount of one or more folic acid-containing food components such that the composition contains between 0 to 50 µg of folic acid, including but not limited to e.g., 0 to 50 µg of folic acid, 1 to 50 µg of folic acid, 0 to 35 µg of folic acid, 1 to 5 µg of folic acid, 0 to 25 µg of folic acid, 1 to 25 µg of folic acid, 10 to 50 µg of folic acid, 15 to 50 µg of folic acid, 10 to 35 µg of folic acid, 15 to 5 µg of folic acid, 10 to 25 µg of folic acid, 15 to 25 µg of folic acid, etc.

Food compositions of the present disclosure may include one or more vitamin D-containing food components. In some instances, the vitamin D-containing food component may be or may be derived from one or more of fish oil, fatty fish, mushrooms, tofu, fortified cereal, fish roe, queso fresco, extra lean ham, eggs, plain soy yogurt, beef liver, etc. In some instances, the composition contains an amount of one or more vitamin D-containing food components such that the composition contains between 0 to 8.5 µg of vitamin D, including but not limited to e.g., 0 to 8.5 µg of vitamin D, 1 to 8.5 µg of vitamin D, 0 to 7 µg of vitamin D, 1 to 7 µg of vitamin D, 3 to 8.5 µg of vitamin D, 5 to 8.5 µg of vitamin D, 3 to 7 µg of vitamin D, 5 to 7 µg of vitamin D, etc.

Food compositions of the present disclosure may include one or more vitamin B3-containing food components. In some instances, the vitamin B3-containing food component may be or may be derived from one or more of fish, chicken, turkey, pork, peanuts, beef, grilled portobello, green peas, sunflower seeds, avocado, broccoli, asparagus, kidney beans, tahini, bell peppers, shiitake, enoki, wheat, millet, barley, rye, almonds, lentils, etc. In some instances, the composition contains an amount of one or more vitamin B3-containing food components such that the composition contains between 0 to 9 mg of vitamin B3, including but not limited to e.g., 0 to 9 mg of vitamin B3, 1 to 9 mg of vitamin B3, 0 to 6 mg of vitamin B3, 1 to 6 mg of vitamin B3, 0 to 5 mg of vitamin B3, 1 to 5 mg of vitamin B3, 3 to 9 mg of vitamin B3, 4 to 9 mg of vitamin B3, 3 to 6 mg of vitamin B3, 4 to 6 mg of vitamin B3, 3 to 5 mg of vitamin B3, 4 to 5 mg of vitamin B3, etc.

Food compositions of the present disclosure may include one or more vitamin E-containing food components. In some instances, the vitamin E-containing food component may be or may be derived from one or more of dark leaf greens, almonds, sunflower seeds, avocado, shrimp, trout, olive oil, broccoli, butternut squash, kiwi, sweet potato, whet germs, palm oil, hazelnut, pine nut, parsley, papaya, olives, pine nuts, red bell pepper, mango, basil, oregano, mango, pistachios, peanut butter, red chili paprika, tomatoes, etc. In some instances, the composition contains an amount of one or more vitamin E-containing food components such that the composition contains between 0 to 6 mg of vitamin E, including but not limited to e.g., 0 to 6 mg of vitamin E, 1 to 6 mg of vitamin E, 0 to 4 mg of vitamin E, 1 to 4 mg of vitamin E, 0 to 3 mg of vitamin E, 1 to 3 mg of vitamin E, 2 to 6 mg of vitamin E, 3 to 6 mg of vitamin E, 2 to 4 mg of vitamin E, 3 to 4 mg of vitamin E, 2 to 3 mg of vitamin E, etc.

Food compositions of the present disclosure may include one or more vitamin B12-containing food components. In some instances, the vitamin B12-containing food component may be or may be derived from one or more of shellfish, beef, chicken, liver, fish, yogurt, eggs, etc. In some instances, the composition contains an amount of one or more vitamin B12-containing food components such that the composition contains between 0 to 0.7 µg of vitamin B12, including but not limited to e.g., 0 to 0.7 µg of vitamin B12, 0.1 to 0.7 µg of vitamin B12, 0 to 0.5 µg of vitamin B12, 0.1 to 0.5 µg of vitamin B12, 0 to 0.3 µg of vitamin B12, 0.1 to 0.3 µg of vitamin B12, 0.2 to 0.7 µg of vitamin B12, 0.3 to 0.7 µg of vitamin B12, 0.2 to 0.5 µg of vitamin B12, 0.3 to 0.5 µg of vitamin B12, 0.2 to 0.3 µg of vitamin B12, etc.

In some instances, the food compositions may exclude one or more of the above listed nutrients. For example, in some cases, a food composition may exclude one or more of a lutein-containing component, a DHA-containing component, an iron-containing component, a zinc-containing component, a copper-containing component, a choline-containing component, a vitamin A-containing component, a vitamin B6-containing component, a selenium-containing component, a iodine-containing component, a folate-containing component, a vitamin D-containing component, a vitamin B3-containing component, a vitamin E-containing component and a vitamin B12-containing component.

In some instances, a food composition formulated to be administered during a predetermined month of infant development may be formulated to contain only those of the above described nutrients that are listed with the corresponding month of development in Table 1 and Table 2. As will be readily understood, the individually prescribed nutrients for each month may, in some instances, be combined to produce a multi-month composition, e.g., a composition suitable for administration over two or more months.

Food compositions of the present disclosure may include one or more protein-containing food components. In some instances, the protein-containing food component may be or may be derived from one or more of greek yogurt, cottage cheese, swiss cheese, eggs, milk, whey protein, beef, eggs, almonds, chicken breast, turkey breast, oats, broccoli, quinoia, whey protein, lentils, ezekiel bread, pumpkin seeds, brussel sprouts, peanuts, flax, hubbard squash, peas, falafel, passion fruit, avocado, oatmeal, hummus, green beans, pistachios, black rice, chickpea pasta, etc. In some instances, the composition contains an amount of one or more protein-containing food components such that the composition contains between 0 to 16 calories of protein, including but not limited to e.g., 0 to 16 calories of protein, 1 to 16 calories of protein, 0 to 14 calories of protein, 1 to 14 calories of protein, 0 to 13 calories of protein, 1 to 13 calories of protein, 5 to 16 calories of protein, 10 to 16 calories of protein, 5 to 14 calories of protein, 10 to 14 calories of protein, 5 to 13 calories of protein, 10 to 13 calories of protein, etc.

In some instances, the composition contains an amount of one or more fat-containing food components such that the composition contains between 0 to 117 calories of fat, including but not limited to e.g., 0 to 117 calories of fat, 1 to 117 calories of fat, 0 to 67 calories of fat, 1 to 67 calories of fat, 0 to 33 calories of fat, 1 to 33 calories of fat, 0 to 25 calories of fat, 1 to 25 calories of fat, 10 to 117 calories of fat, 20 to 117 calories of fat, 10 to 67 calories of fat, 20 to 67 calories of fat, 10 to 33 calories of fat, 20 to 33 calories of fat, 10 to 25 calories of fat, 20 to 25 calories of fat, etc.

In some instances, the composition contains an amount of one or more fat-containing food components such that the composition contains between 0 to 350 calories of carbohydrates/sugar, including but not limited to e.g., 0 to 350 calories of carbohydrates/sugar, 1 to 350 calories of carbohydrates/sugar, 0 to 200 calories of carbohydrates/sugar, 1 to 200 calories of carbohydrates/sugar, 0 to 100 calories of carbohydrates/sugar, 1 to 100 calories of carbohydrates/sugar, 0 to 80 calories of carbohydrates/sugar, 1 to 80 calories of carbohydrates/sugar, 10 to 350 calories of carbohydrates/sugar, 50 to 350 calories of carbohydrates/sugar, 10 to 200 calories of carbohydrates/sugar, 50 to 200 calories of carbohydrates/sugar, 10 to 100 calories of carbohydrates/sugar, 50 to 100 calories of carbohydrates/sugar, 10 to 80 calories of carbohydrates/sugar, 50 to 80 calories of carbohydrates/sugar, etc.

In some instances, a food composition of the present disclosure may include or exclude one or more food additives. Non-limiting examples of food additives include added sugars, texturing agents, stabilizers, moisture control agents, emulsifiers, preservatives and/or antioxidants, flavors, flavor enhancers (e.g., salt), colors, cloud agents, milk solids, gums, a fiber containing component, combinations thereof, and the like.

In some instances, a food composition of the present disclosure may include or exclude added sugar. Added sugars may, where present, be included in the composition to impart bulk and/or sweetness and/or to assist with moisture management. Various sugars may be employed. In some instances, sucrose may be the predominant sugar. In some instances, a monosaccharide sugar may be included, e.g., to assist in preventing crystallization of sucrose during storage. In some instances, a subject composition may be substantially free of added sugar and/or other sweeteners.

Where employed, suitable sweeteners include, but are not limited to, sucrose, glucose, dextrose, maltose, dextrin, invert sugar, fructose, levulose, galactose, lactose, corn syrup, corn syrup solids, saccharin, brown sugar, fruit juice, tagatose, honey, molasses and mixtures thereof. In some instances, sugarless sweeteners may be used or excluded. For example, in some instances, sugar alcohols such as sorbitol, mannitol, xylitol, erythritol, hydrogenated starch hydrolysates, maltitol, and mixtures thereof are suitable for use in the present compositions. In some instances, sugar replacers may be used or excluded. Examples of suitable sugar replacers, where employed, include high intensity artificial sweeteners such as, for example, sucralose, aspartame, N-substituted APM derivatives such as neotame, salts of acesulfame, altitame, saccharin and its salts, cyclamic acid and its salts, glycyrrhizinate, dihydrochalcones, thaumatin, monellin, and mixtures thereof.

In some instances, a food composition of the present disclosure may include or exclude a texturing agent. Where employed, various texturing ingredients may be included in the composition to obtain the desired mouthfeel. For example, vegetable shortening may be employed in some instances to impart a smooth, plastic texture. In some instances, dried egg white may be employed as a suitable texturizing ingredient.

In some instances, a food composition of the present disclosure may include or exclude a stabilizer. Stabilizers, such as starch and hydrocolloids, such as gums, may be included in certain compositions to function as gelling agents and/or as water binding agents. Modified, uncooked starches, such as those derived from waxy-maize or from tapioca, are suitable for use in some instances. Non-limiting examples of hydrocolloids that may be utilized may be chosen from the group consisting of guar gum, locust bean gum, cellulose ethers, such as methylcellulose, carrageenan, propylene glycol alginate and the like.

In some instances, a food composition of the present disclosure may include or exclude one or more starches. Where employed, useful starches may include, for example, modified tapioca starch, modified rice starch, modified corn starch, potato starch, specialty starches, and mixtures thereof. As non-limiting examples, a modified tapioca starch such as FRIGEX HV®, FRIGEX®, and TEXTRA®, which are available from National Starch and Chemical Company of Bridgewater, N.J., and other specialty starches such as PURITY® brand, CLEARJEL®, and the NOVATION® series (for example, NOVATION® 3300 AND NOVATION® 3600), which are all available from National Starch and Chemical Company of Bridgewater, N.J., may be employed.

In some instances, the starch is substantially hydrated during processing. The hydration process is dependent upon several factors, which include time, temperature, shear conditions, moisture content, presence of additives or other dissolved components, and the type of starch used.

In some instances, a food composition of the present disclosure may include or exclude a moisture control agent. Where employed, useful moisture control agents may vary. Non-limiting examples include glycerin, or other low-molecular weight, polyhydric alcohols, which may be utilized in the composition to bind moisture and thus control or maintain the composition moisture at a desired level. Other humectants, such as carbohydrate-based humectants, may be used in some instances, e.g., in place of or in addition to one or more polyhydric alcohols.

In some instances, a food composition of the present disclosure may include or exclude an emulsifier. Non-limiting examples of suitable emulsifiers include lactylic acid esters of fatty acids, ethoxylated monoglycerides and diglycerides, polyglycerol esters and diacetyl tartic acid esters, mixtures thereof and the like. Exemplary emulsifiers which may be employed in the present compositions include but are not limited to sorbitan monostearate, mono- and/or di-glycerides polyoxyethylene sorbitan fatty acids esters, such as polysorbate 60 (polyoxyethylene (20) sorbitan monostearate), and sodium stearoyl-2-lactylate. Suitable emulsifiers also include but are not limited to e.g., mono- and diglycerides (e.g., mono- and diglycerides alone, mono- and diglycerides and propylene glycol, mono- and diglycerides and citric acid, glyceryl lacto esters of fatty acids, etc.), distilled monoglycerides (e.g., monoglycerides alone, monoglycerides with ascorbic acid, monoglycerides with mixed tocopherols and ascorbic acid, monoglycerides with ascorbic acid and citric acid, monoglycerides and fully hydrogenated soybean oil with citric acid and ascorbic acid, etc.), ethoxylated monoglycerides (e.g., ethoxylated mono- and diglycerides, ethoxylated mono- and diglycerides with or without mixed tocopherols, and/or citric acid), propylene glycol mono esters (PGME) (e.g., propylene glycol mono- and diesters of fats and fatty acids), lactylates (e.g., sodium stearoyl lactylate (SSL), calcium stearoyl lactylate (CSL), SSL and CSL combinations, oleyl lactylic oleate and tocopherols (OLA), etc.), non-GMO emulsifiers (e.g., non-GMO versions of any of the above described emulsifiers and the like), hydrated emulsifiers, beaded fats (e.g., hydrogenated cottonseed oil, etc.), and the like.

In some instances, a food composition of the present disclosure may include or exclude a preservative. For example, in some instances, a composition of the present disclosure may be "preservative free". In some instances, a useful preservative and/or antioxidant may be employed. Where employed various preservatives, such as potassium sorbate, antioxidants, such as propyl gallate, may be included in a composition of the present disclosure. Antioxidants and preservatives may generally inhibit oxidation which results in rancidity. Useful antioxidants and preservatives may also include mixed tocopherols, citric acid, ascorbic acid, TBHQ, BHT, BHA, propyl gallate, and the like.

In some instances, a food composition of the present disclosure may include or exclude a fiber containing component. Where employed, suitable fiber containing components may include but are not limited to cellulose, polydextrose, raftilose, raftilin, fructooligosaccharides (NutraFlora®), palatinose oligosaccharide, guar gum hydrolysate (Sun Fiber®), dextrin and maltodextrin (Nutriose® Brand, supplied by Roquette), indigestible dextrin (Fibersol®), inulin or mixtures thereof.

In some instances, the subject food compositions may be formulated to contain a particular amount of total nutrition (i.e., an amount of total calories). For example, the subject food composition may be formulated as a single serving with a target amount of total calories and/or with a target range of total calories. The amount of total calories a subject food composition may be formulated to contain will vary any may range from more than zero to 1000 or more including but not limited to e.g., less than 1000, less than 900, less than 800, less than 750, less than 700, less than 650, less than 600, less than 550, less than 500, less than 450, less than 400, less than 350, less than 300, less than 250, less than 225, less than 200, less than 175, less than 150, less than 125, less than 100, less than 90, less than 80, greater than 500, greater than 450, greater than 400, greater than 350, greater than 300, greater than 250, greater than 225, greater than 200, greater than 175, greater than 150, greater than 125, greater than 100, greater than 90, greater than 80, 10 to 1000, 20 to 1000, 30 to 1000, 30 to 800, 30 to 600, 30 to 400, 30 to 350, 30 to 300, 30 to 250, 30 to 200, 30 to 150, 30 to 100, 30 to 50, 10 to 20, 10 to 30, 10 to 40, 10 to 50, 10 to 60, 10 to 70, 10 to 80, 10 to 90, 10 to 100, 18 to 20, 18 to 30, 18 to 40, 18 to 50, 18 to 60, 18 to 70, 18 to 80, 18 to 90, 18 to 100, and the like.

In some instances, the subject food compositions may be formulated for single servings where such single servings may contain the caloric content, or a fraction thereof, recommended daily intake for an infant of the age to which the food composition is directed. For example, a food composition may include 100% or less of the recommended daily caloric intake, including but not limited to e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, etc. In some instances, a food composition may include some easily divided portion of the recommended daily caloric intake for an infant of the age to which it is directed (e.g., 50%, 33%, 25%, etc.) such that the daily feedings of the infant may be made up of some round number of multiples of the food composition. In some instances, the compositions may be formulated with the total daily volume intake of the infant in mind. The recommended volume intake of an infant is 150 mL per kg per day.

In some instances, the food composition may be formulated as a single serving container sized for 1 or more feedings per day, including e.g., sized for one feeding per day, sized for 2 feedings (of two single serving containers) per day, sized for 3 feedings (of three single serving containers) per day, sized for 4 feedings (of four single serving containers) per day, and the like. Any convenient form of single serving containers may be employed, including but not limited to e.g., a pouch, a bottle, a tube, a packet, etc.

The subject compositions may be formulated in various ways including but not limited to e.g., were the food composition is formulated as an infant formula (e.g., a liquid infant formula, a powder infant formula), a liquid drink, a puree, a semi-solid, or the like.

The compositions of the present disclosure may be formulated by a variety of methods including e.g., where the subject components, e.g., as described above, are combined into the composition. Such a method may include processing the composition through one or more food processing steps, including but not limited to one or more of the food processing steps described herein, such as freezing, drying, freeze-drying, dicing, slicing, mincing, macerating, liquefaction, emulsification, cooking (such as boiling, broiling, frying, grilling, steaming, searing, etc.), pickling, curing, pasteurizing, fermenting, blending, pureeing and the like. Making a subject food composition may further include packing the composition into a suitable container, including e.g., bulk containers or single serving containers (e.g., pouches, bottles, tubes, packets, etc.).

Various suitable containers may be employed. Examples of suitable containers include but are not limited to those with a flexible body, including sachets, pouches, bottles, and the like, as well as those with a rigid or semi-rigid body, including hard bottles, cartons, boxes, and the like.

As will be readily understood by one of skill in the art, pouches for use with the present compositions may be any suitable pouch, including e.g., spouted pouches. In general, pouches are multi-layered laminates of with printable outer layers and inner layers with barrier properties. Examples of suitable types of pouches include shaped pouches, stand-up pouches, retort pouches, box pouches, slider pouches, zipper pouches, and the like and the preceding with or without an attached spout. Pouches may be obtained from various sources including but not limited to e.g., manufacturers such as Glenroy, Inc. (Menomonee Falls, Wis.) or ProAmpac (Cincinnati, Ohio).

In some embodiments, the container employed to contain a compositions of the present disclosure may be a single- or multi-use pouch which in the art is also referred to as a sachet. Sachets may also be in the form of shaped, stand-up, retort, box, slider, and zipper sachets, and the like.

The flexible body of an employed container may be made with any of a variety of suitable materials. In some embodiments, the flexible body will be formed out of polymers or plastics used in the packaging of consumer products. These include, but are not limited to, polycarbonate (PC), polyethylene terephthalate (PET), high density polyethylene (HDPE), low density polyethylene (LDPE), polypropylene (PP), and polyvinyl chloride (PVC) and combinations thereof. In the case of retort pouches or sachets, the inner layer may be formed of thin metal foils. In some embodiments, the flexible body may be formed by coextruding inner and outer layers.

In some embodiments, the polymers or plastics used to form the flexible body can be made of biodegradable or dissolvable polymers. Biodegradable polymers are a specific type of polymer that breaks down after its intended purpose to result in natural byproducts such as gases ($CO_2$, $N_2$), water, biomass, and inorganic salts. Biodegradable polymers are found both naturally and synthetically made, and largely consist of ester, amide, and ether functional groups. Biodegradable polymers that may be employed include, but are not limited to: polyhydroxyalkanoates (PHAs) like the poly-3-hydroxybutyrate (PHB), polyhydroxyvalerate (PHV) and polyhydroxyhexanoate (PHH); polylactic acid (PLA); polybutylene succinate (PBS), polycaprolactone (PCL), and polyanhydrides (PAH). Dissolvable polymers that can be used include, but are not limited to: polyvinyl alcohol (PVOH); most of the starch derivatives; cellulose esters like cellulose acetate and nitrocellulose and their derivatives (celluloid).

In some instances, hard, i.e., non-flexible or substantially non-flexible, containers may be employed to contain a composition of the present disclosure. Non-limiting examples of suitable non-flexible or substantially non-flexible containers include vessels such as vials, tubes, jars, bottles, flasks, jugs, carboys, and the like. Such containers may be constructed of various materials including but not limited to e.g., rigid or semi-rigid polymers or plastics, biodegradable or dissolvable polymers, glass, metal (e.g., stainless steel, aluminum, etc.), and the like.

In some instances, a container containing a composition of the present disclosure may include a suitable spout through which the composition (e.g., configured as a fluid or semi-solid) may be introduced into, and/or removed from, the inside of the container. The spout may be connected to the body of the container by various means. A spout suitable for use in the present containers may be made of any suitable material. Non-limiting examples of such materials include the polymers or plastics used in the packaging of consumer products. These include, but are not limited to, high density polyethylene (HDPE), low density polyethylene (LDPE), polypropylene (PP), polycarbonate (PC), polyethylene terephthalate (PET), and polyvinyl chloride (PVC). In some embodiments, the spout may be formed of metal, or the biodegradable or dissolvable polymers discussed above.

In some instances, a container containing a composition of the present disclosure may be specially configured to be handled and/or manipulated by an infant, toddler and/or child. Various methods may be employed in configuring a subject container for an infant, toddler and/or child. For example, in some instances, the container may be sized for infant, toddler and/or child sized hands or grip (e.g., the container may have a diameter sized to be compatible with an infant, toddler and/or child sized hand or grip). In some instances, a subject container may include one or more handles sized for infant, toddler and/or child sized hand or grip. Useful handle configurations include two handles positioned symmetrically or asymmetrically on the container, e.g., on opposite sides of the container, e.g., to be gripped by both hands of an infant, toddler and/or child.

In some instances, an employed container or a spout thereof may be configured to prevent leaks, including but not limited to, configured to prevent leaks when handled by an infant, toddler and/or child. Any of various methods of rendering a subject container or an opening and/or spout thereof "leak resistant" and/or "leak proof" may be employed.

Methods of the present disclosure may include methods of administering a food composition as described herein, and/or a system of food compositions as described below, to an infant. The food compositions and/or components of the system may be administered according to a schedule. Such methods may promote healthy neurodevelopment of the infant and/or enhance neurodevelopment of the infant of the infant brain generally or specific regions of the infant brain, e.g., as described herein.

Kits and Systems

As summarized above, the present disclosure also provides kits and systems that relate to the subject food compositions and for use in the subject methods.

Provided are kits comprising a plurality of single units of the subject food compositions, including e.g., where a subject kit includes a plurality of single serving containers each containing the food composition. Where a plurality of single units are present in a subject kit, the food composition contained within each individual unit may be the same or different. For example, in some instances, the individual units of a kit may all be formulated for administration during the same developmental window. In some instances, two or more of the individual units of a kit may be formulated for administration during different developmental windows.

In some instances, a subject kit will contain sufficient units for feeding an infant for a designated period of time ranging from one day or more, including but not limited to e.g., one day, more than one day, two days, three days, four days, five days, six days, a week, two weeks, three weeks, four weeks, a month, etc.

Also provided are infant feeding systems that include two or more food compositions as described above. The two or more food compositions of the subject systems will generally include food compositions for feeding an infant during at least two different neural-developmental windows. Such windows may vary, as described above, including e.g., where such windows are one month in duration, two months in duration, three months in duration, etc., or a range of months, including e.g., from month 3 to month 6, from month 7 to month 9, from month 10 to month 12, from month 13 to month 18, and the like.

In some instances, the subject systems may include two or more food compositions, each providing specific nutrition for a different neural-developmental window. In some instances, the subject systems may include three or more food compositions, each providing specific nutrition for a different neural-developmental window. In some instances, the subject systems may include four or more food compositions, each providing specific nutrition for a different neural-developmental window.

The different food compositions, or multi-unit kits thereof, for a particular developmental window of a subject system may be provided to a user at the same or different times. For example, in some instances, a user may receive, from a food composition provider, different food compositions formulated for at least two different developmental windows. In some instances, a user may receive, from a food composition provider, only one type of food composition formulated for only one developmental window at a time. For example, in some instances, the food compositions for each specific development window may only be provided to a user one at a time, e.g., to prevent the user from administering a food composition during an improperly matched window. Such providing may be managed by any convenient means including e.g., through a subscription service, e.g., where food deliveries are paired with a user provided age of the infant to which the food compositions are directed. Distribution of food compositions, including where a subscription service is employed, can be managed through any convenient means or market place, including e.g., physical stores, mail order, online, etc.

In addition to the above components, the subject kits and/or systems may further include (in certain embodiments) instructions for practicing the subject methods. These instructions may be present in the subject kits or provided with the subject systems in a variety of forms, one or more of which may be present in the kit or provided with the subject systems. One form in which these instructions may be present is as printed information on a suitable medium or substrate, e.g., a piece or pieces of paper on which the information is printed, in the packaging of the kit or cell line(s), in a package insert, and the like. Yet another form of these instructions is a computer readable medium, e.g., diskette, compact disk (CD), flash drive, and the like, on which the information has been recorded. Yet another form of these instructions that may be present is a website address which may be used via the internet to access the information at a removed site.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., room temperature (RT); base pairs (bp); kilobases (kb); picoliters (ph; seconds (s or sec); minutes (m or min); hours (h or hr); days (d); weeks (wk or wks); nanoliters (nl); microliters (ul); milliliters (ml); liters (L); nanograms (ng); micrograms (ug); milligrams (mg); grams ((g), in the context of mass); kilograms (kg); equivalents of the force of gravity ((g), in the context of centrifugation); nanomolar (nM); micromolar (uM), millimolar (mM); molar (M); amino acids (aa); kilobases (kb); base pairs (bp); nucleotides (nt); intramuscular (i.m.); intraperitoneal (i.p.); subcutaneous (s.c.); and the like.

Example 1: Formulation of Food Compositions for Four Neurodevelopmental Windows Between Ages 3 and 18 Months Food-based nutrient pouches are formulated for developmental windows between 3 and 18 months of age corresponding to: (1) 3 to 6 months, (2) 7 to 9 months, (3) 10 to 12 months and (4) 13 to 18 months. Specific nutrient formulations for each window are devised based on the nutritional requirements of specific brain areas, and the neurons thereof, undergoing rapid growth and development within the window.

The nutrient pouch formulations for each window are provided in Table 2. The provided nutrient amounts represent the target maximum value for each nutrient within the final composition; however these amounts may range, e.g., from zero to the depicted maximum value.

TABLE 2

| Nutrient | 3-6 mos. | 7-9 mos. | 10-12 mos. | 13-18 mos. |
| --- | --- | --- | --- | --- |
| Lutein (micrograms) | 50 | 75 | 100 | 150 |
| DHA (mg) | 20 | 25 | 35 | 50 |
| Iron (mg) | 6 | 8 | 9 | 10 |
| Zinc (mg) | 4 | 5 | 5 | 10 |
| Copper (mg) | 0.4 | 0.5 | 0.6 | 0.7 |
| Choline (mg) | 25 | 35 | 50 | 55 |
| Vitamin A (RE/day) | 375 | 375 | 375 | 400 |
| Vitamin B6 (mg) | 0.3 | 0.6 | 0.6 | 1 |
| Selenium (micrograms) | 10 | 15 | 15 | 20 |
| Iodine (micrograms) | 40 | 40 | 50 | 70 |
| Folic Acid (micrograms) | 25 | 35 | 35 | 50 |
| Vitamin D (ug) | 8.5 | 8.5 | 7 | 7 |
| Vitamin B3 (niacin) (mg) | 5 | 5 | 6 | 9 |
| Vitamin E (mg a-tocopherol) | 3 | 4 | 4 | 6 |
| Vitamin B12 (micrograms) | 0.3 | 0.5 | 0.5 | 0.7 |

The formulations for each window are configured with target maximum total caloric values of 80, 100, 200 and 350, respectively. However, the total caloric values for each window may range, e.g., from 18-80, 30-100, 30-200 and 30-350, respectively. In the provided examples, the subject formulation of each pouch may further include protein content corresponding to 0-13 cal., 0-14 cal., 0-14 cal., and 0-16 cal., respectively. The subject formulation of each pouch may further include fat content corresponding to 0-25 cal., 0-33 cal., 0-67 cal., and 0-117 cal., respectively. The subject formulation of each pouch may further include carbohydrate/sugar content corresponding to 0-80 cal., 0-100 cal., 0-200 cal., and 0-350 cal., respectively.

Notwithstanding the appended claims, the disclosure is also defined by the following clauses:

1. A food composition comprising: an amount of a lutein-containing food sufficient to provide between 0 to 150 µg of lutein; an amount of a docosahexaenoic acid (DHA)-containing food sufficient to provide between 0 to 50 mg of DHA; an amount of an iron-containing food sufficient to provide between 0 to 10 mg of iron; an amount of a zinc-containing food sufficient to provide between 0 to 10 mg of zinc; an amount of a copper-containing food sufficient to provide between 0 to 0.7 mg of copper; an amount of a choline-containing food sufficient to provide between 0 to 55 mg of choline; an amount of a vitamin A-containing food sufficient to provide between 0 to 400 retinol equivalents (RE) of vitamin A; an amount of a vitamin B6-containing food sufficient to provide between 0 to 1 mg of vitamin B6; an amount of a selenium-containing food sufficient to provide between 0 to 20 µg of selenium; an amount of a iodine-containing food sufficient to provide between 0 to 70 µg of iodine; an amount of a folic acid-containing food sufficient to provide between 0 to 50 µg of folic acid; an amount of a vitamin D-containing food sufficient to provide between 0 to 8.5 µg of vitamin D; an amount of a vitamin B3-containing food sufficient to provide between 0 to 9 mg of vitamin B3; an amount of a vitamin E-containing food sufficient to provide between 0 to 6 mg of vitamin E and an amount of a vitamin B12-containing food sufficient to provide between 0 to 0.7 µg of vitamin B12.
2. The food composition according to Clause 1, wherein the food composition is a single serving of 18 to 350 total calories.
3. The food composition according to Clause 2, wherein the food composition is a single serving of 30 to 350 total calories.
4. The food composition according to any of the preceding clauses, wherein the food composition comprises 0 to 16 calories of protein.
5. The food composition according to any of the preceding clauses, wherein the food composition comprises 0 to 117 calories of fat.
6. The food composition according to Clause 1, wherein the amount of the lutein-containing food is sufficient to provide between 0 to 100 µg of lutein; the amount of the docosahexaenoic acid (DHA)-containing food is sufficient to provide between 0 to 35 mg of DHA; the amount of the iron-containing food is sufficient to provide between 0 to 9 mg of iron; the amount of the zinc-containing food is sufficient to provide between 0 to 5 mg of zinc; the amount of the copper-containing food sufficient to provide between 0 to 0.6 mg of copper; the amount of the choline-containing food is sufficient to provide between 0 to 50 mg of choline; the amount of the vitamin A-containing food is sufficient to provide between 0 to 375 retinol equivalents (RE) of vitamin A; the amount of the vitamin B6-containing food is sufficient to provide between 0 to 0.6 mg of vitamin B6; the amount of the selenium-containing food is sufficient to provide between 0 to 15 µg of selenium; the amount of the iodine-containing food is sufficient to provide between 0 to 50 µg of iodine; the amount of the folic acid-containing food is sufficient to provide between 0 to 35 µg of folic acid; the amount of the vitamin D-containing food is sufficient to provide between 0 to 7 µg of vitamin D; the amount of the vitamin B3-containing food is sufficient to provide between 0 to 6 mg of vitamin B3; the amount of the vitamin E-containing food is sufficient to provide between 0 to 4 mg of vitamin E and an amount of a vitamin B12-containing food sufficient to provide between 0 to 0.5 µg of vitamin B12.
7. The food composition according to Clause 6, wherein the food composition is a single serving of 30 to 200 total calories.
8. The food composition according to Clauses 6 or 7, wherein the food composition comprises 0 to 14 calories of protein.
9. The food composition according to any of Clauses 6 to 8, wherein the food composition comprises 0 to 67 calories of fat.
10. The food composition of Clause 1, wherein the amount of the lutein-containing food is sufficient to provide between 0 to 75 µg of lutein; the amount of the docosahexaenoic acid (DHA)-containing food is sufficient to provide between 0 to 25 mg of DHA; the amount of the iron-containing food is sufficient to provide between 0 to 8 mg of iron; the amount of the zinc-containing food is sufficient to provide between 0 to 5 mg of zinc; the amount of the copper-containing food sufficient to provide between 0 to 0.5 mg of copper; the amount of the choline-containing food is sufficient to provide between 0 to 35 mg of choline; the amount of the vitamin A-containing food is sufficient to provide between 0 to 375 retinol equivalents (RE) of vitamin A; the amount of the vitamin B6-containing food is sufficient to provide between 0 to 0.6 mg of vitamin B6; the amount of the selenium-containing food is sufficient to provide between 0 to 15 µg of selenium; the amount of the iodine-containing food is sufficient to provide between 0 to 40 µg of iodine; the amount of the folic acid-containing food is sufficient to provide between 0 to 35 µg of folic acid; the amount of the vitamin D-containing food is sufficient to provide between 0 to 8.5 µg of vitamin D; the amount of the vitamin B3-containing food is sufficient to provide between 0 to 5 mg of vitamin B3; the amount of the vitamin E-containing food is sufficient to provide between 0 to 4 mg of vitamin E and an amount of a vitamin B12-containing food sufficient to provide between 0 to 0.5 µg of vitamin B12.
11. The food composition according to Clause 10, wherein the food composition is a single serving of 30 to 100 total calories.
12. The food composition according to Clauses 10 or 11, wherein the food composition comprises 0 to 14 calories of protein.
13. The food composition according to any of Clauses 10 to 12, wherein the food composition comprises 0 to 33 calories of fat.
14. The food composition of Clause 1, wherein the amount of the lutein-containing food is sufficient to provide between 0 to 50 µg of lutein; the amount of the docosahexaenoic acid (DHA)-containing food is sufficient to provide between 0 to 20 mg of DHA; the amount of the iron-containing food is sufficient to provide between 0 to 6 mg of iron; the amount of the zinc-containing food is sufficient to provide between 0 to 4 mg of zinc; the amount of the copper-containing food sufficient to provide between 0 to 0.4 mg of copper; the amount of the choline-containing food is sufficient to provide between 0 to 25 mg of choline; the amount of the vitamin A-containing food is sufficient to provide between 0 to 375 retinol equivalents (RE) of vitamin A; the amount of the vitamin B6-containing food is sufficient to provide between 0 to 0.3 mg of vitamin B6; the amount of the selenium-containing food is sufficient to provide between 0 to 10 µg of selenium; the amount of the iodine-containing food is sufficient to provide between 0 to 40 µg of iodine; the amount of the folic acid-containing food is sufficient to provide between 0 to 25 µg of folic acid; the amount of the vitamin D-containing food is sufficient to provide between 0 to 8.5 µg of vitamin D; the amount of the vitamin B3-containing food is sufficient to provide between 0 to 5 mg of vitamin B3; the amount of the vitamin E-containing food is sufficient to provide between 0 to 3 mg of vitamin E and an amount of a vitamin B12-containing food sufficient to provide between 0 to 0.3 µg of vitamin B12.

15. The food composition according to Clause 14, wherein the food composition is a single serving of 18 to 80 total calories.

16. The food composition according to Clauses 14 or 15, wherein the food composition comprises 0 to 13 calories of protein.

17. The food composition according to any of Clauses 14 to 16, wherein the food composition comprises 0 to 25 calories of fat.

18. The food composition according to any of the preceding clauses, wherein the lutein-containing food is selected from the group consisting of: leafy greens, broccoli, zucchini, brussel sprouts, garden peas, corn, carrots, okra, celery, oranges, tomatoes, melons, grapefruit, beets, asparagus, eggs, spinach, kiwi, grapes, zucchini, squash, and combinations thereof.

19. The food composition according to any of the preceding clauses, wherein the DHA-containing food is selected from the group consisting of: fish, eggs, walnuts, chia, flaxseed, seaweed, lamb, beef, game meat, poultry, and combinations thereof.

20. The food composition according to any of the preceding clauses, wherein the iron-containing food is selected from the group consisting of: beef, chicken, turkey, ham, fish, veal, beans, tofu, breakfast cereal, pumpkin seeds, sesame seeds, squash seeds, lima beans, kidney beans, chickpeas, dried apricots, baked potato, egg noodles, wheat germ, split peas, nuts, dried raisins, dried peaches, dried prunes, broccoli, raw spinach, pasta, bread, brown or enriched rice, and combinations thereof.

21. The food composition according to any of the preceding clauses, wherein the zinc-containing food is selected from the group consisting of: oysters, beef, lamb, wheat germ, spinach, pumpkin seeds, cashews, chocolate, pork, chicken, chickpeas, fortified cereal, oatmeal, kidney beans, almonds, flax seeds, lima beans, eggs yolks, peanuts, brown rice, peas, and combinations thereof.

22. The food composition according to any of the preceding clauses, wherein the copper-containing food is selected from the group consisting of: sunflower seeds, lentils, almonds, asparagus, seafood, kale, sesame seeds, cashews, chickpeas, avocados, goat cheese, blackberries, kiwi, grapes, mangos, raspberries, pineapple, bosc pears, potatoes, turnip, taro, lima beans, spinach, asparagus, swiss chard, lentils, almonds, and combinations thereof.

23. The food composition according to any of the preceding clauses, wherein the choline-containing food is selected from the group consisting of: liver, eggs, cauliflower, mushrooms, beet greens, shellfish, asparagus, brussel sprouts, cooked bok choy, collard greens, broccoli, swiss chard, spinach, chicken, turkey, tuna, salmon, beef, green peas, cabbage, green beans, summer squash, and combinations thereof.

24. The food composition according to any of the preceding clauses, wherein the vitamin A-containing food is selected from the group consisting of: sweet potato, carrots, dark leafy greens, squash, dried apricots, cantaloupe, sweet red pepper, tuna, mango, spinach, broccoli, liver, cod oil, eggs, butter, cream, and combinations thereof.

25. The food composition according to any of the preceding clauses, wherein the vitamin B6-containing food is selected from the group consisting of: sunflower seeds, pistachos, tuna, turkey, chicken, pork, beef, bananas, avocados, spinach, sweet potato, hazelnuts, plantaine, wheat bran, oatmeal, and combinations thereof.

26. The food composition according to any of the preceding clauses, wherein the selenium-containing food is selected from the group consisting of: brazil nuts, tuna, oysters, sunflower seeds, whole wheat bread, pork, beef, chicken, turkey, mushrooms, rye, eggs, cheese, mushrooms, oats, wheat, rye, brown rice, soya beans, pasta, and combinations thereof.

27. The food composition according to any of the preceding clauses, wherein the iodine-containing food is selected from the group consisting of: sea vegetables, cranberries, yogurt, navy beans, strawberries, cheese, potatoes, milk, eggs, lima beans, corn, green peas, bananas, tuna, cod shrimp, baked potato, milk, shrimp, prunes, yogurt, bananas, strawberries, canned corn, white bread, green beans, pineapple, rhubarb, watercress, and combinations thereof.

28. The food composition according to any of the preceding clauses, wherein the folate-containing food is selected from the group consisting of: black eyed peas, lentils, dark leafy greens, asparagus, avocado, broccoli, mango, citrus fruit, white bread, papaya, strawberries, raspberries, beans, peas, lentils, okra, brussel sprouts, sunflower seed, flax seed, peanuts, almonds, cauliflower, corn, beets, celery, carrots, winter squash, summer squash, and combinations thereof.

29. The food composition according to any of the preceding clauses, wherein the vitamin D-containing food is selected from the group consisting of: fish oil, fatty fish, mushrooms, tofu, fortified cereal, fish roe, queso fresco, extra lean ham, eggs, plain soy yogurt, beef liver, and combinations thereof.

30. The food composition according to any of the preceding clauses, wherein the vitamin B3-containing food is selected from the group consisting of: fish, chicken, turkey, pork, peanuts, beef, grilled portobello, green peas, sunflower seeds, avocado, broccoli, asparagus, kidney beans, tahini, bell peppers, shiitake, enoki, wheat, millet, barley, rye, almonds, lentils, and combinations thereof.

31. The food composition according to any of the preceding clauses, wherein the vitamin E-containing food is selected from the group consisting of: dark leaf greens, almonds, sunflower seeds, avocado, shrimp, trout, olive oil, broccoli, butternut squash, kiwi, sweet potato, whet germs, palm oil, hazelnut, pine nut, parsley, papaya, olives, pine nuts, red bell pepper, mango, basil, oregano, mango, pistachios, peanut butter, red chili paprika, tomatoes, and combinations thereof.

32. The food composition according to any of the preceding clauses, wherein the vitamin B12-containing food is selected from the group consisting of: shellfish, beef, chicken, liver, fish, yogurt, eggs and combinations thereof.

33. The food composition according to any of the preceding clauses, wherein the food composition comprises a protein-containing food selected from the group consisting of: greek yogurt, cottage cheese, swiss cheese, eggs, milk, whey protein, beef, eggs, almonds, chicken breast, turkey breast, oats, broccoli, quinoia, whey protein, lentils, ezekiel bread, pumpkin seeds, brussel sprouts, peanuts, flax, hubbard squash, peas, falafel, passion fruit, avocado, oatmeal, hummus, green beans, pistachios, black rice, chickpea pasta, and combinations thereof.

34. The food composition according to any of the preceding clauses, wherein the food composition is an infant formula.

35. The food composition according to Clause 34, wherein the infant formula is a liquid infant formula.

36. The food composition according to Clause 34, wherein the infant formula is a dry powder formula.

37. The food composition according to any of Clauses 1 to 33, wherein the food composition is a puree.

38. The food composition according to any of Clauses 1 to 33, wherein the food composition is a semi-solid.

39. The food composition according to any of the preceding clauses, wherein the food composition is present in a single serving container.

40. The food composition according to Clause 39, wherein the single serving container is a pouch.

41. A kit comprising a plurality of single serving containers according to Clause 39 sufficient for feeding an infant aged from 3 to 18 months for a period of at least 1 day.

42. The kit according to Clause 41, wherein the kit comprises a plurality of single serving containers sufficient for feeding an infant aged from 3 to 18 months for a period of at least one week.

43. An infant feeding system comprising two or more food compositions, each providing specific nutrition for a different neural-developmental window.

44. The system according to Clause 43, wherein the two or more food compositions are selected from the group consisting of:
a 3 month to 6 month neural-developmental window composition;
a 7 month to 9 month neural-developmental window composition;
a 10 month to 12 month neural-developmental window composition; and
a 13 month to 18 month neural-developmental window composition.

45. The system according to Clause 44, wherein the 3 month to 6 month neural-developmental window composition comprises: an amount of a lutein-containing food sufficient to provide between 0 to 50 µg of lutein; an amount of a docosahexaenoic acid (DHA)-containing food sufficient to provide between 0 to 20 mg of DHA; an amount of an iron-containing food sufficient to provide between 0 to 6 mg of iron; an amount of a zinc-containing food sufficient to provide between 0 to 4 mg of zinc; an amount of a copper-containing food sufficient to provide between 0 to 0.4 mg of copper; an amount of a choline-containing food sufficient to provide between 0 to 25 mg of choline; an amount of a vitamin A-containing food sufficient to provide between 0 to 375 retinol equivalents (RE) of vitamin A; an amount of a vitamin B6-containing food sufficient to provide between 0 to 0.3 mg of vitamin B6; an amount of a selenium-containing food sufficient to provide between 0 to 10 µg of selenium; an amount of a iodine-containing food sufficient to provide between 0 to 40 µg of iodine; an amount of a folic acid-containing food sufficient to provide between 0 to 25 µg of folic acid; an amount of a vitamin D-containing food sufficient to provide between 0 to 8.5 µg of vitamin D; an amount of a vitamin B3-containing food sufficient to provide between 0 to 5 mg of vitamin B3; an amount of a vitamin E-containing food sufficient to provide between 0 to 3 mg of vitamin E and an amount of a vitamin B12-containing food sufficient to provide between 0 to 0.3 µg of vitamin B12.

46. The system according to Clause 44, wherein the 7 month to 9 month neural-developmental window composition comprises: an amount of a lutein-containing food sufficient to provide between 0 to 75 µg of lutein; an amount of a docosahexaenoic acid (DHA)-containing food sufficient to provide between 0 to 25 mg of DHA; an amount of an iron-containing food sufficient to provide between 0 to 8 mg of iron; an amount of a zinc-containing food sufficient to provide between 0 to 5 mg of zinc; an amount of a copper-containing food sufficient to provide between 0 to 0.5 mg of copper; an amount of a choline-containing food sufficient to provide between 0 to 35 mg of choline; an amount of a vitamin A-containing food sufficient to provide between 0 to 375 retinol equivalents (RE) of vitamin A; an amount of a vitamin B6-containing food sufficient to provide between 0 to 0.6 mg of vitamin B6; an amount of a selenium-containing food sufficient to provide between 0 to 15 µg of selenium; an amount of a iodine-containing food sufficient to provide between 0 to 40 µg of iodine; an amount of a folic acid-containing food sufficient to provide between 0 to 35 µg of folic acid; an amount of a vitamin D-containing food sufficient to provide between 0 to 8.5 µg of vitamin D; an amount of a vitamin B3-containing food sufficient to provide between 0 to 5 mg of vitamin B3; an amount of a vitamin E-containing food sufficient to provide between 0 to 4 mg of vitamin E and an amount of a vitamin B12-containing food sufficient to provide between 0 to 0.5 µg of vitamin B12.

47. The system according to Clause 44, wherein the 10 month to 12 month neural-developmental window composition comprises: an amount of a lutein-containing food sufficient to provide between 0 to 100 µg of lutein; an amount of a docosahexaenoic acid (DHA)-containing food sufficient to provide between 0 to 35 mg of DHA; an amount of an iron-containing food sufficient to provide between 0 to 9 mg of iron; an amount of a zinc-containing food sufficient to provide between 0 to 5 mg of zinc; an amount of a copper-containing food sufficient to provide between 0 to 0.6 mg of copper; an amount of a choline-containing food sufficient to provide between 0 to 50 mg of choline; an amount of a vitamin A-containing food sufficient to provide between 0 to 375 retinol equivalents (RE) of vitamin A; an amount of a vitamin B6-containing food sufficient to provide between 0 to 0.6 mg of vitamin B6; an amount of a selenium-containing food sufficient to provide between 0 to 15 µg of selenium; an amount of a iodine-containing food sufficient to provide between 0 to 50 µg of iodine; an amount of a folic acid-containing food sufficient to provide between 0 to 35 µg of folic acid; an amount of a vitamin D-containing food sufficient to provide between 0 to 7 µg of vitamin D; an amount of a vitamin B3-containing food sufficient to provide between 0 to 6 mg of vitamin B3; an amount of a vitamin E-containing food sufficient to provide between 0 to 4 mg of vitamin E and an amount of a vitamin B12-containing food sufficient to provide between 0 to 0.5 µg of vitamin B12.

48. The system according to Clause 44, wherein the 13 month to 18 month neural-developmental window composition comprises: an amount of a lutein-containing food sufficient to provide between 0 to 150 µg of lutein; an amount of a docosahexaenoic acid (DHA)-containing food sufficient to provide between 0 to 50 mg of DHA; an amount of an iron-containing food sufficient to provide between 0 to 10 mg of iron; an amount of a zinc-containing food sufficient to provide between 0 to 10 mg of zinc; an amount of a copper-containing food sufficient to provide between 0 to 0.7 mg of copper; an amount of a choline-containing food sufficient to provide between 0 to 55 mg of choline; an amount of a vitamin A-containing food sufficient to provide between 0 to 400 retinol equivalents (RE) of vitamin A; an amount of a vitamin B6-containing food sufficient to provide between 0 to 1 mg of vitamin B6; an amount of a selenium-containing food sufficient to provide between 0 to 20 µg of selenium; an amount of a iodine-containing food sufficient to provide between 0 to 70 µg of iodine; an amount of a folic acid-containing food sufficient to provide between 0 to 50 µg of folic acid; an amount of a vitamin D-containing food sufficient to provide between 0 to 7 µg of vitamin D; an amount of a vitamin B3-containing food sufficient to provide between 0 to 9 mg of vitamin B3; an amount of a vitamin E-containing food sufficient to provide between 0 to 6 mg of vitamin E and an amount of a vitamin B12-containing food sufficient to provide between 0 to 0.7 µg of vitamin B12.

49. The system according to any of Clauses 43 to 48, wherein the system comprises three or more food compositions, each providing specific nutrition for a different neural-developmental window.

50. The system according to Clause 49, wherein the system comprises four food compositions, each providing specific nutrition for a different neural-developmental window.

51. A method of formulating a single serving infant food composition for a neural-developmental window, the method comprising: combining an amount of a lutein-containing food sufficient to provide between 0 to 150 µg of lutein; an amount of a docosahexaenoic acid (DHA)-containing food sufficient to provide between 0 to 50 mg of DHA; an amount of an iron-containing food sufficient to provide between 0 to 10 mg of iron; an amount of a zinc-containing food sufficient to provide between 0 to 10 mg of zinc; an amount of a copper-containing food sufficient to provide between 0 to 0.7 mg of copper; an amount of a choline-containing food sufficient to provide between 0 to 55 mg of choline; an amount of a vitamin A-containing food sufficient to provide between 0 to 400 retinol equivalents (RE) of vitamin A; an amount of a vitamin B6-containing food sufficient to provide between 0 to 1 mg of vitamin B6; an amount of a selenium-containing food sufficient to provide between 0 to 20 µg of selenium; an amount of a iodine-containing food sufficient to provide between 0 to 70 µg of iodine; an amount of a folic acid-containing food sufficient to provide between 0 to 50 µg of folic acid; an amount of a vitamin D-containing food sufficient to provide between 0 to 8.5 µg of vitamin D; an amount of a vitamin B3-containing food sufficient to provide between 0 to 9 mg of vitamin B3; an amount of a vitamin E-containing food sufficient to provide between 0 to 6 mg of vitamin E and a protein-containing food and an amount of a vitamin B12-containing food sufficient to provide between 0 to 0.7 µg of vitamin B12, wherein the infant food composition comprises 350 or less total calories.

The preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of the present invention is embodied by the appended claims.

What is claimed is:

1. A food composition comprising:
    i. iodine from an iodine food component;
    ii. vitamin D from a vitamin D food component;
    iii. choline from a choline food component;
    iv. iron from an iron food component;
    V. vitamin B3 from a vitamin B3 food component;
    vi. vitamin B6 from a vitamin B6 food component;
    vii. vitamin B12 from a vitamin B12 food component;
    viii. vitamin E from a vitamin E food component;
    ix. selenium from an selenium food component; and
    X. docosahexaenoic acid (DHA) from a DHA food component;
wherein
    the iodine is present in an amount between 1-50 µg
wherein
    the iodine food component is selected from the group consisting of sea vegetables, cranberries, yogurt, navy beans, strawberries, cheese, potatoes, milk, eggs, lima beans, corn, green peas, bananas, tuna, cod, shrimp, prunes, green beans, pineapple, rhubarb, watercress, and combinations thereof;
the vitamin D is present in an amount between 0.1-8.5 µg;
the choline is present in an amount between 1-55 mg;
the iron is present in an amount between 1-6 mg;
the vitamin B3 is present in an amount between 1-6 mg;
the vitamin B6 is present in an amount between 0.1-1 mg;
the vitamin B12 is present in an amount between 0.1-0.7 µg;
the vitamin E is present in an amount between 0.1-6 mg;
the selenium is present in an amount between 1-15 µg; and
the DHA is present in an amount between 5-25 mg.

2. The food composition of claim 1, wherein the food composition comprises: between 10-50 µg of the iodine; between 1-7 µg of the vitamin D; between 5-55 mg of the choline; between 2-6 mg of the iron; between 1-5 mg of the vitamin B3; between 0.1-0.3 mg of the vitamin B6; between 0.1-0.5 µg of the vitamin B12; between 1-4 mg of the vitamin E; between 2-15 ug of the selenium; and between 10-20 mg of the DHA.

3. The food composition of claim 1, wherein
the vitamin D food component is selected from the group consisting of fish oil, fatty fish, mushrooms, tofu, fish roe, queso fresco, ham, eggs, soy yogurt, beef liver, and combinations thereof;
the choline food component is selected from the group consisting of liver, eggs, cauliflower, mushrooms, beet greens, shellfish, asparagus, brussel sprouts, bok choy, collard greens, broccoli, swiss chard, spinach, chicken, turkey, tuna, salmon, beef, green peas, cabbage, green beans, summer squash, and combinations;
the iron food component is selected from the group consisting of beef, chicken, turkey, ham, fish, veal, beans, tofu, pumpkin seeds, sesame seeds, squash seeds, lima beans, kidney beans, chickpeas, apricots, potato, egg noodles, wheat germ, split peas, nuts, raisins, peaches, prunes, broccoli, spinach, brown rice, enriched rice, and combinations thereof;
the vitamin B3 food component is selected from the group consisting of fish, chicken, turkey, pork, peanuts, beef, portobello, green peas, sunflower seeds, avocado, broccoli, asparagus, kidney beans, tahini, bell peppers, shiitake mushroom, enoki, wheat, millet, barley, rye, almonds, lentils, and combinations thereof;
the vitamin B6 food component is selected from the group consisting of sunflower seeds, pistachios, tuna, turkey, chicken, pork, beef, bananas, avocados, spinach, sweet potato, hazelnuts, plantain, wheat bran, oatmeal, and combinations thereof;
the vitamin B12 food component is selected from the group consisting of shellfish, beef, chicken, liver, fish, yogurt, eggs, and combinations thereof;
the vitamin E food component is selected from the group consisting of dark leaf greens, almonds, sunflower seeds, avocado, shrimp, trout, olive oil, broccoli, butternut squash, kiwi, sweet potato, wheat germs, palm oil, hazelnut, pine nut, parsley, papaya, olives, pine nuts, red bell peppers, mango, basil, oregano, pistachios, peanut butter, red chili paprika, tomatoes, and combinations thereof;
the selenium food component is selected from the group consisting of brazil nuts, tuna, oysters, sunflower seeds, whole wheat bread, pork, beef, chicken, turkey, mushrooms, rye, eggs, cheese, oats, wheat, brown rice, soya beans, pasta, and combinations thereof; and
the DHA food component is selected from the group consisting of fish, eggs, walnuts, chia, flaxseed, seaweed, lamb, beef, game meat, poultry, and combinations thereof.

4. The food composition of claim 1, wherein the food composition further comprises one or more of lutein, protein, zinc, folic acid, vitamin A, and copper.

5. The food composition of claim 1, wherein the food composition further comprising lutein, protein, zinc, folic acid, vitamin A, and copper.

6. The food composition of claim 5, comprising: up to 10 mg of zinc, and up to 0.7 mg of the copper.

7. The food composition of claim 5, comprising: up to 10 mg of the zinc, up to 50 µg of the folic acid, up to 400 retinal equivalents (RAE) of the vitamin A, up to 0.7 mg of the copper, and up to 16 calories from the protein.

8. A method of promoting neurodevelopment in an infant aged 3-18 months
comprising administering the food composition of claim 5.

9. The food composition of claim 1, further comprising lutein, protein, zinc, folic acid, vitamin A, and copper;
wherein the lutein is from a lutein food component, the protein is from a protein food component, the zinc is from a zinc food component, the folic acid is from a folic acid food component, the vitamin A if from a vitamin A food component, and the copper is from a copper food component.

10. The food composition of claim 9, wherein:
the lutein food component is selected from the group consisting of leafy greens, broccoli, zucchini, brussel sprouts, garden peas, corn, carrots, okra, celery, oranges, tomatoes, melons, grapefruit, beets, asparagus, eggs, spinach, kiwi, grapes, squash, and combinations thereof;
the protein food component is selected from the group consisting of Greek yogurt, cottage cheese, swiss cheese, eggs, milk, whey protein, beef, almonds, chicken, turkey, oats, broccoli, quinoa, lentils, bread, pumpkin, brussels sprouts, peanuts, flax, squash, peas, falafel, passion fruit, avocado, hummus, green beans, pistachios, black rice, pasta, and combinations thereof;
the zinc is food component is selected from the group consisting of oysters, beef, lamb, wheat germ, spinach, pumpkin seeds, cashews, chocolate, pork, chicken, chickpeas, oatmeal, kidney beans, almonds, flax seeds, lima beans, egg yolks, peanuts, brown rice, peas, and combinations thereof;
the folic acid food component is selected from the group consisting of black-eyed peas, lentils, dark leafy greens, asparagus, avocado, broccoli, mango, citrus fruit, white bread, papaya, strawberries, raspberries, beans, peas, okra, brussel sprouts, sunflower seed, flax seed, peanuts, almonds, cauliflower, corn, beets, celery, carrots, winter squash, summer squash, and combinations thereof;
the vitamin A food component is selected from the group consisting of sweet potato, carrots, dark leafy greens, squash, apricots, cantaloupe, sweet red pepper, tuna, mango, spinach, broccoli, liver, cod oil, eggs, butter, cream, and combinations thereof; and the copper food component is selected from the group consisting of sunflower seeds, lentils, almonds, asparagus, seafood, kale, sesame seeds, cashews, chickpeas, avocados, goat cheese, blackberries, kiwi, grapes, mangos, raspberries, pineapple, bosc pears, potatoes, turnip, taro, lima beans, spinach, swiss chard, almonds, and combinations thereof.

11. The food composition of claim 9, comprising: up to 10 mg of zinc, and up to 0.7 mg of the copper.

12. The food composition of claim 9, comprising: up to 10 mg of the zinc, up to 50 μg of the folic acid, up to 400 retinal equivalents (RAE) of the vitamin A, up to 0.7 mg of the copper, and up to 16 calories from the protein.

13. The food composition of claim 12, comprising up to 150 μg of the lutein.

14. A kit comprising a one or more single serving units, wherein each single serving unit comprises the food composition of claim 1.

15. The kit contains of claim 14, comprising sufficient single serving units for a designated period of one or more days.

16. The kit of claim 15, wherein the designated period is one day, two days, three days, four days, five days, six days, or one week.

17. A method of promoting neurodevelopment in an infant aged 3-18 months
comprising administering the food composition of claim 1.

* * * * *